July 17, 1928.

G. B. LINDERMAN, JR

METER

Filed Aug. 14, 1923

INVENTOR
Garrett B. Linderman, Jr.
BY
A. B. Reavis
ATTORNEY

July 17, 1928.

G. B. LINDERMAN, JR 1,677,834

METER

Filed Aug. 14, 1923

INVENTOR
Garrett B. Linderman, Jr.
BY
A. B. Reavis
ATTORNEY

Patented July 17, 1928.

1,677,834

UNITED STATES PATENT OFFICE.

GARRETT B. LINDERMAN, JR., OF BETHLEHEM, PENNSYLVANIA, ASSIGNOR, BY MESNE ASSIGNMENTS, TO AMERICAN METER COMPANY, INCORPORATED, OF NEW YORK, N. Y., A CORPORATION OF DELAWARE.

METER.

Application filed August 14, 1923. Serial No. 657,344.

My invention relates to fluid meters and more particularly to flow meters for measuring gases and other fluids and it has for an object to provide apparatus of this character which shall correctly measure fluids in terms of predetermined or standard units.

A further object of my invention is to provide a gas meter which shall automatically determine the quantity of gas referred to standard conditions of the physical characteristics of temperature, pressure, and moisture content.

A further object of my invention is to provide a gas meter of the orifice type in which the effects of changes in specific gravity, in absolute pressure, in temperature, and in moisture content shall not affect the operation and determinations of the meter.

A further object of my invention is to provide a gas meter of the variable orifice type in which the area of the orifice changes only upon a change in differential pressure across the orifice in consequence of changes in gas demand.

A further object of my invention is to provide a meter of the variable orifice type and an indicator or recorder, together with common driving means for operating the orifice means and the recorder.

A further object of my invention is to provide a meter of the variable orifice type wherein, for different gas demands, the area of the orifice is so changed as to restore the value of the differential pressure across the orifice existing before the change in demand.

A further object of my invention is to provide a gas meter having variable orifice means, a motor for varying the area of the orifice means, a recorder operated by the motor, and means responsive to a change in differential pressure across the orifice to control the operation of the motor so as to change the area of the orifice in order to restore the original pressure difference across the orifice in case of change in demand for gas.

A further object of my invention is to provide a gas meter having variable orifice means together with apparatus to prevent a change in area of the orifice in consequence of a change in specific gravity of the gas being measured.

A further object of my invention is to provide a meter of the orifice type in which the area of the orifice is dependent upon the demand for gas and in which apparatus is incorporated to prevent any change in orifice area incident to changes in temperature, absolute pressure or moisture content of the gas being measured.

A further object of my invention is to provide apparatus which is operated by a change in specific gravity of gas.

A further object of my invention is to provide a gas meter which shall automatically determine the quantity of gas flowing in units based on predetermined or standard conditions of pressure, temperature and moisture content.

A further object of my invention is to provide a system of floats for controlling the operation of orifice-area-changing means in response to changes in gas demand and which neutralize any tendency of the controlling means to become effective in case of changes in specific gravity, absolute pressure, temperature, or moisture content.

When measuring certain fluids, for example, coke oven gas, it is necessary that the measurement of gas flowing shall be reduced to standard conditions. The unit generally adopted is one cubic foot of gas having a pressure of 30″ of mercury, at a temperature of 60 F. and saturated with moisture. There are many well-known orifice meters in use at the present time in which the area of the orifice is fixed and which utilize the differential pressure or drop in pressure across the orifice as a basis of measurement; however, the readings of meters of the fixed orifice type are affected by varying conditions of (1) temperature, (2) absolute pressure, (3) specific gravity, and (4) moisture content. The factor of absolute pressure represents the result of both the barometric pressure and the pressure in the pipe line. To reduce readings of meters of this type to standard conditions, involves several complex calculations, if charts have not been previously compiled. In addition to the factors referred to, tending to disturb the accuracy of the determinations of a meter of the fixed orifice type, a change in gas demand renders such a meter objectionable for the reason that an orifice having a suitable area for normal demand does not give accurate results when the demand is either abnormally large or small. With excessive demand, the pressure difference increases at a rate greater than the quantity of gas flowing and for small demands the reverse may be true and the pressure difference becomes so small as to lead to inaccurate results.

My invention comprises a gas meter having a variable orifice means in which the area of the orifice is used as a factor in determining the quantity of gas flowing. In my apparatus, when a change in demand for gas occurs, the first effect is a temporary disturbance of the pressure difference across the orifice, such a change in differential pressure resulting in the operation of an appropriate motor which changes the orifice area, this operation continuing until the orifice area assumes such a value that the pressure difference across the orifice is restored to its original value. In addition to apparatus for accomplishing this function, I provide means for preventing changes in differential pressure across the orifice incident to changes in specific gravity of the gas, absolute pressure, temperature or moisture content from affecting the area of the orifice. Hence, with my apparatus, the area of the orifice may be made a function of the quantity of gas flowing referred to standard conditions of temperature, pressure, and moisture content.

My improved gas meter, operating in the manner referred to for the purposes stated, is based upon well-established physical laws; and, in order to facilitate an understanding thereof, these laws will be briefly referred to. The law governing the flow of gas through a main with orifices of varying diameters is well established, as exemplified by the following equation for a sharp-edged orifice: $Q = AK\sqrt{2gh}$, in which Q = cubic feet per second of gas under conditions that exist in the main; A = area of orifice in square feet; K = coefficient of discharge depending on the orifice area and the velocity of approach which in turn depends upon the ratio of the area of the orifice to the area of the pipe; $g$ = acceleration or gravity; and $h$ = differential pressure across the orifice in head feet of gas.

$Q = CQs$, where $Qs$ is the number of cubic feet per second of gas under standard conditions, and where C is the ratio of volume of any quantity of gas flowing to the volume that would be occupied by the same quantity of gas under standard conditions of temperature, pressure and saturation, such standard conditions being a pressure of 30″ mercury, a temperature of 60° F. and saturated, and it may be obtained from the well-known formula $C = \dfrac{460 + T}{17.64(B - X)}$, which formula is frequently used for standardizing gas meters. In this formula, T is the temperature above zero measured in degrees F, B is the absolute pressure measured in inches of mercury, and X is the vapor tension of water at the temperature T.

The density of a gas is equal to its specific gravity (S) times the density of air (.076 lbs. per cu. ft.) divided by the volumetric ratio (C), as explained above. For air, the density is taken as .076 lbs. per cu. ft. at 60°, a pressure of 30″ mercury, and saturated.

The pressure at the bottom of a column of any gas is equal to $hD$, in which $h$ is the height of the column and D is the density of the gas. With apparatus of the character of my invention, it is essential to determine the quantity $hD$ in terms of a balancing but denser material, for example, water, in which case $hD = \dfrac{P}{12} \times 62.369$, but $D = \dfrac{.076 \times S}{C}$. Hence, substituting this value of D in the former equation,
$$\dfrac{hS \times .076}{C} = \dfrac{62.369}{12} \times P, h = \dfrac{62.369}{12} \times \dfrac{1}{.076} \times \dfrac{PC}{S}.$$
The numerical coefficient preceding the factor $\dfrac{PC}{S}$ will vary with the specific gravity of the liquid employed and it may be termed E. Therefore, $h = E \times \dfrac{PC}{S}$, in which P = differential pressure in inches of liquid,
E = a constant depending on the specific gravity of the liquid used in the apparatus of my invention,
C = volumetric ratio as explained above,
S = specific gravity of the gas.

Referring to the original formula,
$$Q = AK\sqrt{2gh},$$
and substituting the values of
$$Q = CQs \text{ and } h = E\dfrac{PC}{S}$$
$$CQs = AK\sqrt{2gE\dfrac{PC}{S}}$$
$$P = \left(\dfrac{Qs}{AK}\right)^2 \dfrac{CS}{2gE}$$
$$\dfrac{P}{CS} = \left(\dfrac{Qs}{AK}\right)^2 \dfrac{1}{2gE}.$$

Since $g$ and E are both constants, if the ratio $\dfrac{P}{CS}$ is held constant, the ratio $\left(\dfrac{Qs}{AK}\right)^2$ will remain constant and the product AK will, therefore, be a direct measure of the quantity ($Qs$) of gas flowing in standard units.

I have embodied means in the apparatus of my invention whereby all changes affecting the value of the ratio, $\dfrac{P}{CS}$, will change the area of the orifice in such a manner that the original value of said ratio will be restored and the value of AK will then be a direct measure of the quantity of gas flowing, reduced to standard conditions. Assuming that the demand for gas changes, the first effect is a change in pressure across the orifice. This corresponds to a change in the numerator, P, of the ratio $\frac{P}{CS}$, and the immediate effect of this change is to set into operation apparatus to vary the size of the orifice; and, as the size of the orifice changes, the pressure difference thereacross approaches the value it had before the change in demand and when it reaches that value the area changing means of the orifice comes to a stop. In other words, with my apparatus, the area of the orifice is made to depend directly upon the gas demand; and with changes in gas demand the orifice area is caused to change in order to restore the differential pressure across the orifice to the value it had before such change took place. This means that, with my apparatus, the numerator, P, of the ratio $\frac{P}{CS}$, is maintained constant for varying demands for gas.

The denominator of the ratio $\frac{P}{CS}$ represents the factors of specific gravity and the quantity C, which, as above pointed out, represents a relation of the factors of temperature, absolute pressure and moisture content. If the specific gravity of a gas flowing through my meter should change, the differential pressure due thereto also changes so that the ratio $\frac{P}{CS}$ remains the same. The same is true of the factors of temperature, absolute pressure, and moisture content represented in the factor C. The area of the orifice is, therefore, changed only due to a change in the value of the ratio $\frac{P}{CS}$, and such a change results only from a change in demand, changes in the factor C and S also simultaneously involving corresponding changes in the value of the numerator, P, so that the ratio is maintained constant with changes in specific gravity, absolute pressure, temperature, and moisture content. Of course, as pointed out, with a change in demand, the value of the ratio $\frac{P}{CS}$ is only temporarily changed for the reason that the resultant change in orifice area causes the numerator P to change so that the ratio $\frac{P}{CS}$ resumes its normal or former value.

Apparatus made in accordance with my invention is illustrated on the accompanying drawings, forming a part of this application, in which.

Referring now to the drawings for a better understanding of my invention, I show a gas main including sections 10 and 11 and an intermediate section 12 carrying adjustable orifice means 13, together with any suitable means, for example, an electric motor 14, for changing the area of the orifice means 13. The motor 14 is also connected to means for indicating the rate and/or quantity of flow such as a suitable recorder and integrator, at 15, so that the area of the orifice determines the operation of the recorder and the integrator. The variable orifice means 13 is caused to operate to change the orifice area in response to changes in gas demand, the latter causing a change in differential pressure across the orifice and a disturbance of the ratio $\frac{P}{CS}$; and the area so changes that the differential pressure, P, resumes its normal or former value and the ratio $\frac{P}{CS}$ resumes its normal or former value. Also, I provide means to prevent changes in specific gravity, in absolute pressure, in temperature, and in the moisture content from affecting the orifice area so that the readings of the meter shall be direct in standard units.

Figure 7:
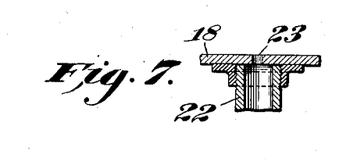
Figures 7 and 8 are detail views illustrating certain features of parts of my apparatus on a larger scale; and, Figures 9, 10 and 11 are diagrammatic views illustrative of principles of my invention.
Figure 8:
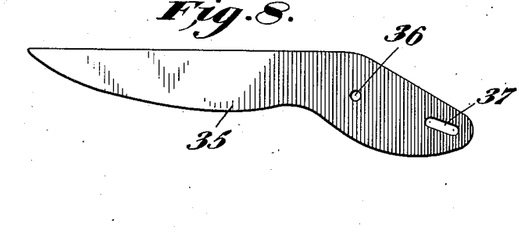

Referring now more particularly to the apparatus for changing the area of the orifice, I show a conduit 16 communicating with the main 10 at the up-stream side of the orifice mechanism 13, the conduit 16 communicating with a conduit 17 which leads to a receptacle 18. A conduit 19 communicates with the main 11 at the down-stream side of the orifice 13 and with a receptacle 20, preferably arranged within the receptacle 18. The conduit 19 also preferably communicates with the receptacle 18 by way of an elbow section 22 and a small port 23, shown more clearly in Figure 7, and it has for its purpose to assure a circulation of gas through the receptacle 18. The receptacles 18 and 20 are separated by a fluid seal consisting of fluid in a cup 25 and a passageway 26 affording communication between the bottom of the receptacle 20 and the bottom of the cup 25. Hence, it results that the fluid in the receptacle 20 is subject to the down-stream gas pressure, whereas the fluid in the cup 25 is subject to the upstream gas pressure. Accordingly, therefore, the level of fluid in the cup 25 will depend upon the difference in up-stream and down-stream pressures.

I provide means for controlling the motor 14 which is responsive to the level of fluid in the cup 25 and, therefore, to the difference in pressure or pressure drop across the orifice 13. For this purpose, I show a float 27 buoyantly supported by fluid in the cup 25 and suspended from a lever 28, the latter carrying contacts 29 adapted to engage with stationary contacts 30 and render the relay, at 32, effective to control the supply of current from the mains 33 in such a way as to operate the motor 14 either in one direction or the other.

With an increase in gas demand, the pressure at the down-stream side of the orifice 13 decreases with the result that the pressure drop across the orifice or the differential pressure increases; and, under this condition, the level of fluid in the cup 25 lowers and the lower contact 29 comes into engagement with the lower contact 30, thereby rendering the relay 32 effective to operate the motor in such a direction as to increase the size of the orifice 13.

As above pointed out, the pressure at the down-stream side of the orifice increases with the increase in area of the latter. Therefore, as the orifice 13 increases in area, the pressure in the receptacle 20 is increased, and the level of fluid in the cup 25 rises until the float 27 causes the lever 28 to move upwardly sufficiently to move the lower movable contact 29 away from the lower stationary contact 30, whereupon the motor 14 ceases to operate. In case of a decrease in the demand for gas, the operation of the apparatus just referred to is the reverse, that is, the decrease in demand causes an increase in pressure at the down-stream side of the orifice and a rise in the level of liquid in the cup 25, resulting in contact of the upper contacts 29 and 30 and operation of the relay 32 so as to supply current to the motor 14 in such a way as to cause the latter to operate to decrease the size of the orifice 13. As the orifice 13 is decreased in size, the pressure at the down-stream side of the orifice decreases with the result that the level of fluid in the cup 25 is lowered until the upper contacts 29 and 30 are separated.

Figure 6:
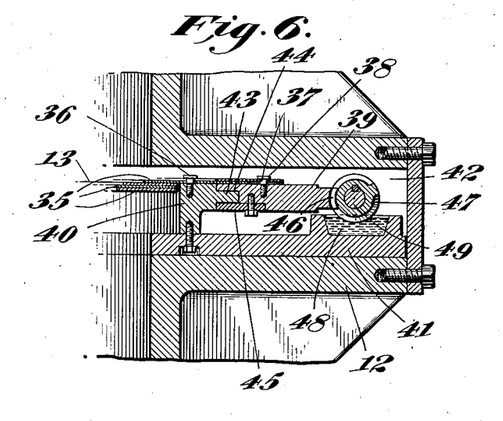
Figure 6 is a fragmentary sectional view taken along the line VI—VI of Figure 1, but on a larger scale and illustrating the mechanism for varying the size of the orifice.

Referring now more particularly to the details of the variable orifice means 13, it is to be understood that, in so far as my invention is concerned, any suitable apparatus may be used to secure variable orifice areas. I prefer to use a contracting and expanding orifice of the iris shutter type employing a plurality of overlapping leaves 35 each of which is pivoted at an intermediate point 36, and each of which is provided at its outer end with a slot 37. The slots 37 of the leaves 35 engage pins 38 carried by a ring 39, the latter being rotated in one direction to diminish the area of the orifice and in the other direction to increase the area of the orifice. The pivots 36 for the leaves 35 are preferably carried by a ring 40 secured in place with respect to a plate 41 arranged in the box-like space 42 for the iris shutter mechanism. The rotary member 39 is rotatably mounted with respect to the ring 40 and it has such a connection with respect to the latter that relatively axial displacement of these parts is prevented. For this purpose, I show a tongue 43 carried by the ring 40 and fitting in a groove 44 provided in the rotary member 39 and having a removable side plate 45 in order to permit of assembly. The rotary member 39 is preferably provided with a segment 46 which meshes with a worm 47 preferably dipping in a receptacle 48 containing oil, the worm 47 being keyed to a shaft 49, preferably extending transversely of the gas main and the shaft being connected to the motor 14 by a train of gearing, at 50. If the member 39 is moved in one direction, the pivoted leaves 35 are caused to slide angularly so as to restrict the area of the orifice, whereas, if the member 39 is moved in the other direction, the area of the orifice is increased.

Figure 1:
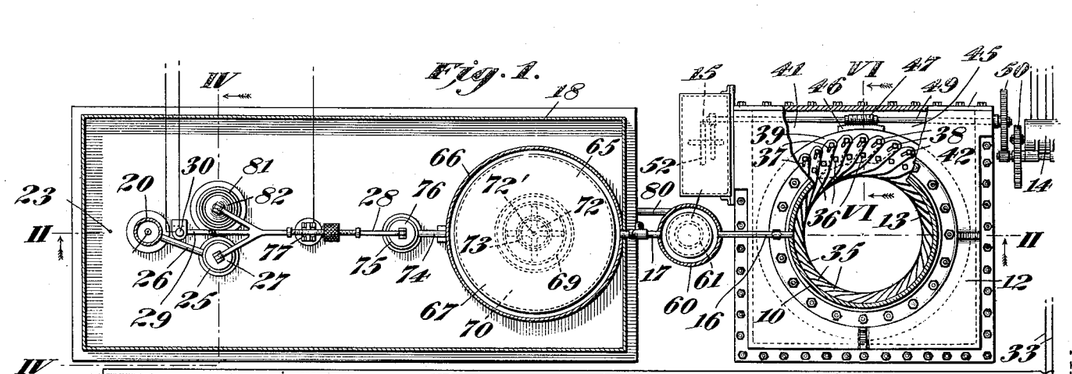
Figure 1, is a plan view of the apparatus, shown partly in section and taken on the line I—I of Figure 2.
Figure 5:
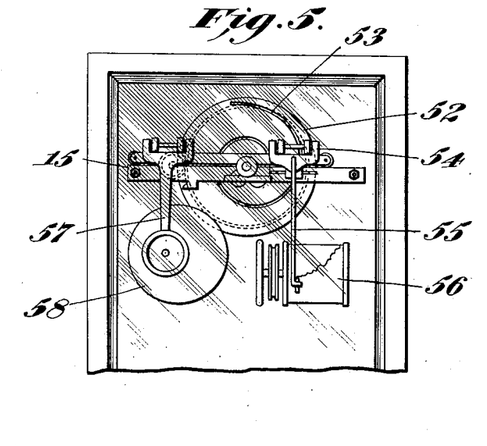
Figure 5 is an enlarged front view of my preferred form of integrating and recording instrument used in combination with my apparatus.

As may be seen from Figure 1, the only connection of the recorder and integrator with the apparatus is by way of the shaft 49. Referring to Figure 5, I show a cam plate 52 which is operatively connected to the shaft 49. The cam plate 52 has a cam groove 53 formed therein, the path of which is determined by the law governing the flow of standard gas, which flow is a function of the area of the orifice and its ratio to the area of the pipe line. In other words, the movement of the cam is a function of the area of the orifice. The flow of gas, as above pointed out, is a function of the product AK, already referred to; however, the coefficient of discharge K is a function of the area of the orifice and of the area of the main, but, since the area of the main is constant, K varies only as a function of A. Hence, a groove 53 may be cut in the face of the cam plate 52 which will move the recording carriage 54 according to the product AK, although the cam plate 52 is moved only as a function of the area of the orifice. The carriage 54 is provided with any suitable means for engaging the cam groove 53; and, with movement of the cam plate 52 in a clock-wise direction, the carriage 54 moves in one direction, and with movement of the cam plate 52 in a counter-clockwise direction, the carriage 54 moves in the other direction.

A stylus 55 is carried by the carriage 54 and it cooperates with a chart drum 56 which may be rotated uniformly at any desired rate, for example, one revolution per day.

The carriage 54 also carries an integrator 57 having a driving wheel of the usual type in frictional driving contact with a revolving disc 58, the rotation of the latter representing a unit of time, preferably four revolutions per hour. When the demand for gas is discontinued, the driving wheel of the integrator is positioned at the axis of the disc 58 and the stylus 55 is arranged in contact with the zero line of the chart drum 56. Since the carriage 54 moves proportionally to the product AK and since the stylus 55 is fixed to the carriage, it necessarily follows that the stylus moves proportionally to the product AK. Hence the distance of the stylus 55 from the zero longitudinal line of the chart is at every instant proportional to the product AK at that instant. Therefore, as the stylus is moved transversely of the chart proportionally to AK, it necessarily follows that the longitudinal graduations parallel to the zero line on the chart must be uniformly spaced. It is to be understood that the stylus and integrator mechanisms herein referred to are old and well-known in the art and that the only feature relating thereto which I have modified is that of a cam plate 52 having a cam groove 53 of the character referred to, the cam plate 52 being operatively connected to the motor means, which is connected to the variable orifice means, the operation of the motor being controlled by apparatus which is responsive to a change in differential pressure across the orifice due to increased demand, the motor continuing to operate until the orifice is changed to such an extent that the normal differential pressure and the former or normal value of the ratio $\frac{P}{CS}$ is resumed for the new demand. With apparatus arranged in this manner, the rate of flow is indicated on the drum 56 and the total amount of gas is recorded by the integrator.

Having particularly described the variable orifice 13 together with apparatus for changing the orifice area of the latter with respect to changes in gas demand, such area changes also affecting the operation of the recorder and integrator mechanism at 15, I will now describe the means which I have devised for neutralizing any tendency of a change in specific gravity of gas to change the area of the orifice.

Figure 2:
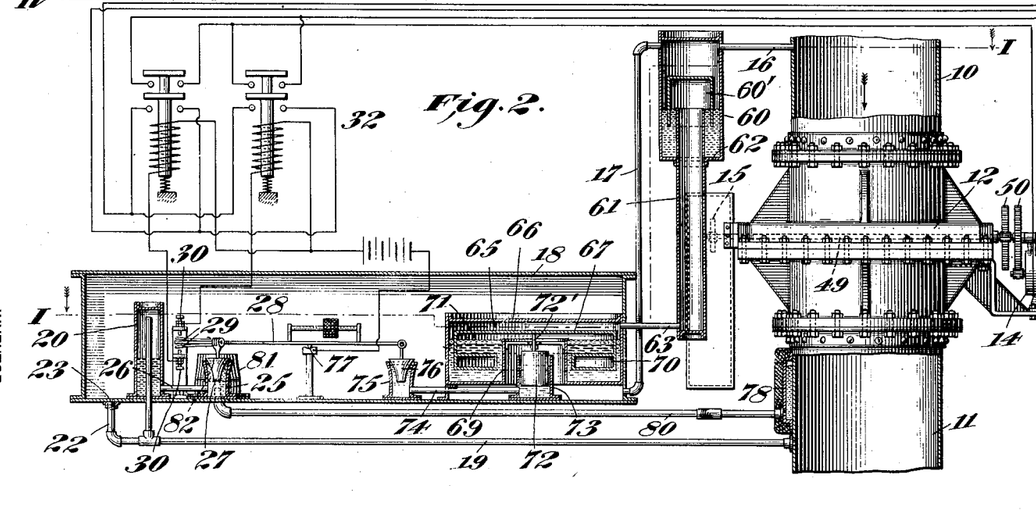
Figure 2 is a sectional view of the apparatus shown partly in elevation.
Figure 3:
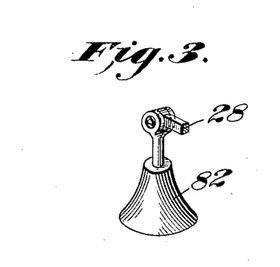
Figure 3 is a perspective view of one of the floats embodied in the apparatus.
Figure 4:
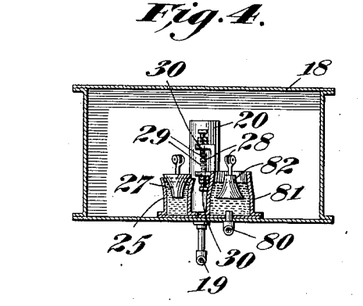
Figure 4 is a sectional view taken along the line IV—IV of Figure 1 and illustrating a portion of the float system.

Referring to Figure 2, it will be seen that the conduit 16 communicating with the section 10 of the main at the up-stream side of the orifice 13 communicates with a receptacle 60, the latter being connected, at its bottom, to a vertical column or conduit 61, the upper end of which terminates above the bottom 62 of the receptacle 60. The conduit 17 is also arranged vertically and communicates with the upper end of the receptacle 60. The column 61 is adapted to contain air while the column 17, of course, contains gas under the conditions existing in the main 10. A seal is provided between the upper ends of the gas and air columns 17 and 61 respectively, this seal preferably taking the form of any suitable fluid confined between the upper end of the column 61 and the walls of the receptacle 60 and an inverted bell 60' surrounding the upper end of the column 61 and having its open end submerged within the fluid.

The lower end of the air column 61 is connected, by a conduit or passage 63, with an air chamber 65 defined between the top of a receptacle 66 and a movable diaphragm member 67, the lower surface of the diaphragm member being subjected to the gas pressure existing in the column 17. The receptacle 66 is preferably provided with an upstanding inner wall 69, which defines, with respect to the wall of the receptacle 66, an annular channel for fluid in which is submerged an annular float 70 carried by the bell-like diaphragm 67. The diaphragm, therefore, serves to separate the air chamber 65 from the gas chamber 71 below the diaphragm.

A float or displacement member 72 is arranged below the diaphragm 67 and it is connected to the latter by a stem or connection 72'. The float or displacement member is arranged in a tank or receptacle 73 containing fluid for purposes hereinafter stated.

The diaphragm 67 moves and assumes a position which is determined by the relative weights of gas and air in the columns 17 and 61. With an increase in specific gravity of the gas, the weight of the column of gas effective below the diaphragm increases, resulting in a disturbance of the equilibrium of forces acting on the diaphragm and upward movement of the latter in consequence of the increased upward force due to the increase in specific gravity. As the diaphragm 67 moves upward, the float 72 is pulled upward and the buoyant effect of the latter is diminished. The diaphragm will, therefore, come to a stop when the increased upward force acting on the diaphragm due to the increase in specific gravity is compensated for by the decreased upward buoyant force acting on the diaphragm brought about by upward movement of the float 72.

If the specific gravity of the gas should decrease, the upward force of the gas on the diaphragm diminishes with the result that the latter starts to move down. The float 72 moves down with the diaphragm; however, downward movement of the float results in increasing its buoyant effect and hence the upward force due thereto acting on the diaphragm. The diaphragm 67 will, therefore, come to a stop when movement takes place in consequence of diminution of specific gravity when the decreased upward force of the gas on the diaphragm is compensated for by an increased upward force acting on the diaphragm due to the increased buoyant effect of the float 72.

Since the diameters of the diaphragm 67 and of the receptacle 66 are relatively much larger than the diameter of the air column 61, the cup 73 and the float 72 are so designed that movement of the diaphragm in consequence of a change in specific gravity is kept to a minimum, thereby avoiding the introduction of inaccuracies due to excessive variation in the air and gas column lengths incident to operation of the mechanism.

In the operation of my device, the movement of the diaphragm 67 is a true measure of the specific gravity of the gas, any variations in the factor of the volumetric ratio C of the gas resulting merely in movement of the bell 60' and consequent variation in the height of the columns of gas and air, thereby avoiding changes in the value of C from affecting the determinations of specific gravity. This will be clear from the following mathematical illustration:

The quantity of liquid in the two vessels 73 and 75 being constant, its level will be directly proportional to the displacement of the plunger 72. Moreover, since the cross-sectional area of the liquid is made constant for all levels and since the plunger 72 is a cylinder, the forces resisting its depression will be directly proportional to its depression. In other words, the height of the liquid in the two chambers 73 and 75 will be directly proportional to the force acting on the plunger 72.

The force acting on the plunger 72 will be the forces acting down on the top of the diaphragm less the forces acting upon the bottom.

The forces acting down are—
$F_d = AP + W + AhD_a$ in which
  $A$ = area of diaphragm,
  $P$ = the absolute pressure in the mains,
  $W$ = net weight of the diaphragm 67, plunger 72 and bell 60.
  $h$ = height of the column of air measured from the diaphragm 67 to the top of the bell 60'. This height, at standard conditions, may be designated by $h_s$. Then, if C is the volumetric ratio of the gas, $h = Ch_s$.
  $D_a$ = density of air contained in the tube 61. This may be written equal to a constant, $n$, times $\frac{Sa}{C}$, where $Sa$ is the specific gravity of air which is equal to unity. Therefore,
$$D_a = n \times \frac{1}{C}.$$

The forces acting up are—
$F_u = AP + B + AhD_g$, in which the common letters have the same meaning as before and in which
  $B$ = buoyancy of float 72,
  $D_g$ = the density of the gas and as before $D_g$ equals constant $n$ times $\frac{S_g}{C}$. $S_g$ = the specific gravity of the gas.

Therefore, the net effect or the force acting on the plunger 72 will be—
$F = F_d - F_u = AP + W + AhD_a - AP - B - AhD_g$.
$F = W - B + AhD_a - AhD_g$
$F = W - B + Ah(D_a - D_g)$
Substituting the values for $h$, $D_a$ and $D_g$, we get
$$F = W - B + ACh_s\left(n\frac{1}{C} - n\frac{S_g}{C}\right)$$
$F = W - B + Ah_s n - Ah_s S_g n$ Now since A, W, B, $h_s$ and $n$ are constants W may be made equal to $B - Ah_s n$. Therefore, $F = W - W - Ah_s n S_g$ or $F = -Ah_s n S_g$. The minus sign signifies that the force, F, acts upwardly. And since A, $h_s$ and $n$ are contants, F is directly proportional to the specific gravity of the gas.

The provision of means movable in response to changes in specific gravity of the gas is utilized for the purpose of neutralizing any tendency of the orifice 13 to change in consequence of a change in differential pressure across the orifice incident to a change in specific gravity. The apparatus for doing this will now be described.

The bottom of the cup 73 communicates, by way of a conduit or passage 74, with a cup 75 open at its top and in the receptacle 18. Liquid is placed in the receptacle 73, passageway 74 and cup 75, and a float 76 is buoyantly supported by the liquid in the cup 75, the float 76 being suspended from the lever 28 at the end of the latter on the opposite side of the fulcrum 77 from the float 27.

If it is assumed that the specific gravity of the gas increases, the effect of such increase is to cause an increase in differential pressure across the orifice, that is, the level of fluid in the cup 25 tends to be lowered; and, unless restrained, the lever 28 would tilt and engage the lower contacts 29 and 30, thereby energizing the relay 32 and setting the motor 14 into operation to enlarge the size of the orifice. However, as the specific gravity changes, the weight of the gas effective beneath the diaphragm 67 becomes greater and the latter rises, raising the displacement member 72 and permitting fluid from the cup 75 to flow back into the receptacle 73. In this way, any tendency of the lever 28 to tilt to engage the lower contacts 29 and 30, incident to an increase in specific gravity of the gas, is compensated for by a decrease in buoyant effect of the float 76. If the specific gravity of the gas should decrease, the reverse operation would take place. Hence, if the specific gravity of the gas changes, the levels of fluid in the cups 25 and 75 rise and fall together with the result that the buoyant effects of the floats 27 and 76 are maintained balanced and the lever 28 is not moved in order to render the motor 14 effective to change the size of the orifice.

Figures 9, 10, 11:
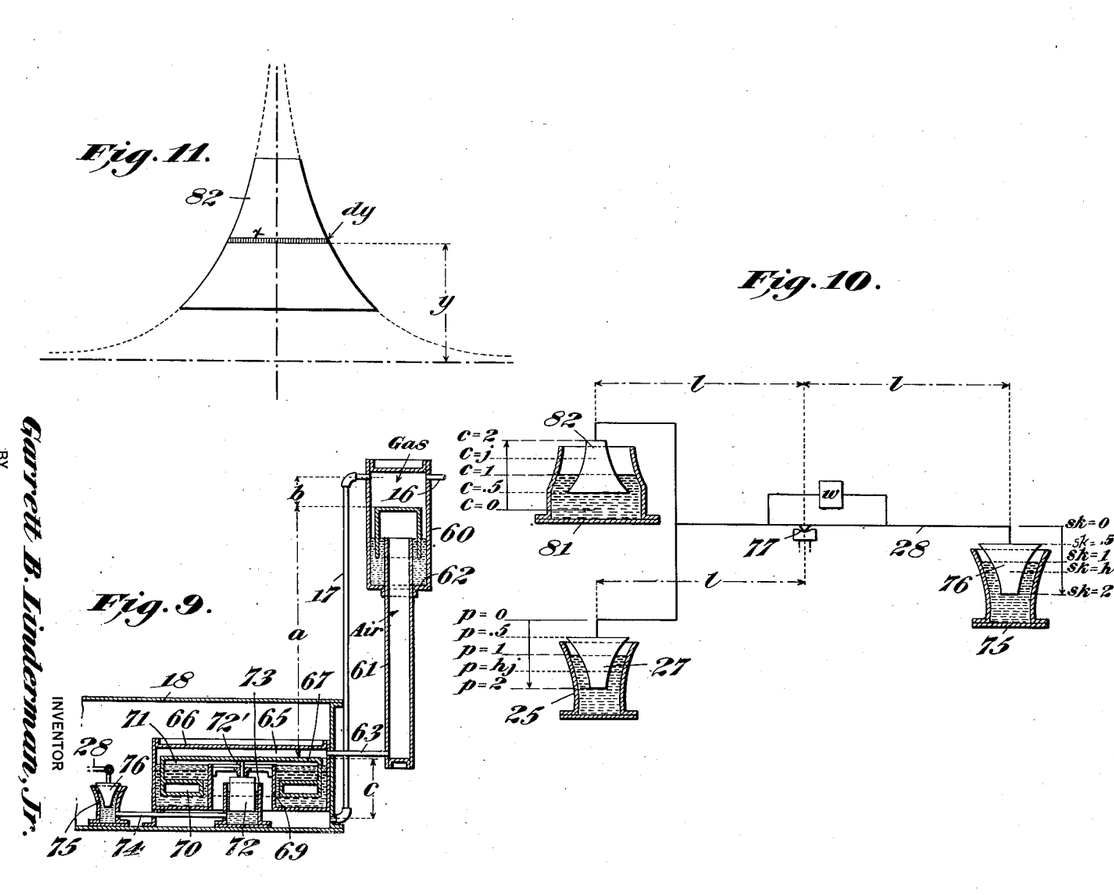

In Figure 9, I show diagrammatically the effective length, $a$, of the air and gas columns. Although the gas column is apparently longer it will be noted that the portion $b$ is also effective on the air column, while the portion $c$ is balanced by a column of the same height below the diaphragm, the net effect being that columns of air and gas of the same height, $a$, are provided so that movement of the diaphragm is determined by the relative weights of the air and gas columns.

Coming now to the apparatus for preventing changes in absolute pressure, temperature, and moisture content from resulting in changes of orifice area, in Figure 2, I show a receptacle 78 in good heat conductive relation with respect to the gas main and adapted to contain a unit of gas and a suitable liquid, the portion in contact with the gas preferably being water. The receptacle 78 is lagged with any suitable heat-insulating material, such as asbestos, in order that conditions in the receptacle 78 may be as nearly like those obtaining in the gas main as possible. The receptacle 78 is connected, near its lower end, to a conduit 80 leading to a cup 81 arranged within the receptacle 18 and in open communication with the latter. Where the fluid therein consists of water, at least at the top, the contiguous unit of gas will be saturated and of the temperature and pressure corresponding to that in the main. The level of fluid in the cup 81, therefore, depends upon the temperature, pressure and moisture content of the gas in the receptacle 78, these characteristics of the latter corresponding to those of the gas in the main.

With an increase in temperature of the gas in the main, the differential pressure across the orifice increases; and, unless the differential-pressure-responsive means, consisting of the receptacles 18 and 20, the cup 25 and the float 27, was counteracted in some way, the motor 14 would be set into operation to enlarge the size of the orifice. Also, unless restrained, a decrease in temperature of gas in the main would result in a diminution in area of the orifice. The effect of the change in differential pressure across the orifice is neutralized by the change in volume of the entrapped gas in the receptacle 78. This entrapped gas, being at the same temperature as the gas in the main will expand and contract in the same proportion as the gas in the main causing the level of liquid in the cup 81 to rise upon an increase in temperature and to fall upon a decrease in temperature.

A float 82 is buoyantly supported by the liquid in the cup 81 and such float is suspended from the same end of the lever as the float 27 but at the opposite end of the lever to the float 76. With an increase of temperature of gas in the main, the unrestrained effect of the resulting increase in differential pressure would be the enlargement of the area of the orifice in the manner already referred to; however, an increase in differential pressure is accompanied by lowering of the level of liquid in the cup 27. Concurrently with this lowering of level in the cup 27, the level of liquid in the cup 81 rises due to the expansion of the entrapped gas in the receptacle 78 with the result that the decrease in buoyancy of the float 27 is compensated for by the increase in buoyancy of the float 82, the net effect being that the lever 28 retains its position. With a decrease in temperature of gas flowing through the main, the contrary operation takes place, that is, the increase in buoyancy of the float 27 is balanced by the decrease in the buoyancy of the float 82, so that the lever 28 is caused to occupy its neutral or inoperative position.

A decrease in absolute pressure in the main results in an increase in differential pressure across the orifice; and, if the effect of the latter was unrestrained the area of the orifice would be restricted in the manner aforesaid. In order to avoid changing of the area of the orifice in consequence of absolute pressure changes in the gas main, I provide neutralizing means which is rendered effective by effects of absolute pressure changes. Assuming that the absolute pressure in the gas main should be increased, the pressure on the liquid in the cup 81 would compress the entrapped gas in the receptacle 78 and lower the level of the liquid and reduce the buoyancy of the float 82, thereby neutralizing the effect of an increase in buoyancy of the float 27 incident to a decrease in differential pressure across the orifice following as a result of the increase in absolute pressure. On the other hand, if the absolute pressure in the main should decrease, resulting in an increase in differential pressure across the orifice, a lowering of the liquid level in the cup 25, and a decrease in buoyancy of the float 27, any tendency of the left hand end of the lever 28 to move down and close the lower contacts is resisted by a concurrently increasing buoyant effect on the float 82.

In view of the fact that the liquid in the receptacle 78 has at least a top layer of water, the entrapped volume of gas will be completely saturated at all temperatures and pressures which is the condition of the gas in the main as will be hereinafter pointed out. It will be understood that the moisture content of a completely saturated gas varies in accordance with the change in temperature and pressure of the gas when the latter is in contact with water. The effect of an increase in moisture content is to increase the volume, and a consequent increase in differential pressure across the orifice. If unrestrained, the increase in differential pressure across the orifice would result in an enlargement of the latter; and, with a decrease in moisture content the contrary operation would take place. Accordingly, therefore, with an increase in moisture content, resulting in an increased differential pressure and a lowering of level of liquid in the cup 25 and consequent diminishing of buoyancy of the float 27, the entrapped gas in the receptacle 78, being subject to the same conditions of temperature and pressure, has the same moisture content as the gas in the main, so that if the moisture content in the main is increased, the volume of entrapped gas in the receptacle 78 is increased on account of the increase in moisture content. This resulting increase in volume of the entrapped gas causes the level of fluid in the cup 81 to rise, thereby increasing the buoyant effect of the float 82 to an extent sufficient to counterbalance the diminished buoyant effect of the float 27. With a decrease in moisture content the differential pressure decreases, the level of fluid in the cup 25 rises, and the buoyant effect of the float 27 is increased. If unrestrained, the lever would move up to close the upper contacts 29 and 30 and operate the motor in such a direction as to restrict the size of the orifice. In order to prevent the latter operation, the level of fluid in the cup 81 is lowered to the extent of the decrease in volume brought about by the decrease in moisture content with the result that the increased buoyant effect of the float 27 is counterbalanced by the decreased buoyant effect of the float 82.

The cups 25, 75 and 81 for the respective floats 27, 76 and 82 are so designed that the horizontal area between each float and its cup is constant from the top to the bottom of the float so that the level changes in direct proportion to the function to which it corresponds. In other words, the surfaces of the cups and floats converge as the radii of the latter increase.

From the foregoing, it will be apparent that I provide three cups, 25, 75 and 81, the levels of liquid in which are directly proportional to the differential pressure, the specific gravity, and the volumetric ratio of the gas. Referring again to the fundamental equation $\frac{P}{SC}=$ to a constant $k$, derived above, this equation, put in the logarithmic form, is $\log P - \log C = \log Sk$. If the floats 27, 76 and 82 are made of such a shape that the forces or buoyant effects due to the rise and fall of liquids above and below the levels at standard conditions are maintained proportional to the logarithms of the liquid levels where the levels are measured up from the bottom and proportional to the logarithms of the reciprocals of the liquid levels where they are measured down from the top, then the floats may operate in conjunction with the lever 28 to control the operation of motor 14 in accordance with this relation. The liquids in the P and $k$S cups, the cups 25 and 75, respectively, are measured down from the top, because, when P and S increase, the liquid levels fall and vice versa. The liquid of the C cup, cup 81, is measured from the bottom for the reason that for an increase in the value of C, hereinbefore determined in terms of absolute pressure, temperature and moisture content, the level rises and vice versa. My device will remain balanced so long as the relation, $\frac{P}{SC}=$ a constant, $k$, remains satisfied. If, however, this relation is not satisfied, the balance arm 28 will tilt and a pair of electric contacts will be closed, thereby energizing the relay 32, and causing the motor 14 to operate to change the size of the orifice, and hence the value of P, until the relation $\frac{P}{SC}=k$ is restored.

Fig. 10 shows a diagrammatic view of the arrangement of floats, cups and balance beam. As stated above the floats are designed to give forces proportional to the logarithms of the liquid level or its reciprocal. A shape of float suitable for this purpose may be arrived at, referring to Fig. 11, as follows:

Let $x=$ horizontal cross-sectional area at distance $y$ above the bottom.

$dy=$ thickness of the elementary lamina as shown.

$xdy=$ volume of this elementary lamina.

$\int xdy=$ volume of the float between any limits we wish, but from the premise displaced volume $=\log$ of liquid level $=\log y$ therefore $\log y = \int xdy$.

Differentiating the left hand side and dropping the integration sign from the right hand side $$\frac{dy}{y} = xdy \text{ or } x = \frac{1}{y}.$$

Applying this to the design of the floats it is found that the cross-sectional area of the floats must be $\frac{1}{P}$, $\frac{1}{C}$ and $\frac{1}{kS}$, respectively. In order that the cross-sectional area of the liquids shall always be constant, it becomes necessary to design the cups accordingly. This is accomplished by adding a constant equal to the desired area of the liquid surface to the cross-sectional area of the floats. From $$\frac{\pi D^2}{4} = \frac{1}{y},$$

$$d_p = \sqrt{\frac{4(1+aP)}{\pi P}}, \quad d_c = \sqrt{\frac{4(1+bC)}{\pi C}}, \text{ and } d_{sk} = \sqrt{\frac{4(1+CSk)}{\pi Sk}}$$

in which $d_p$, $d_c$ and $d_{sk}$ are the diameters of the P, C and Sk cups respectively, and $a$, $b$ and $c$ are the areas of the liquid surfaces.

Considering now the P float 27 and the cup 25 if the associated chamber, 20, is of the same cross-sectional area as the liquid level in the cup 25, namely "$a$", as described above, then it is obvious that a change in differential pressure of one inch will cause a movement of the liquid level in cup 25 of only ½ inch. Therefore, if a range of differential pressure of ½ to 1½ inches is anticipated, the cup and float will have to be designed for a range in liquid level of only ¼ to ¾ inches. The liquid level is then proportional to $\frac{1}{2}\frac{P}{}$.

The receptacle 78 is so proportioned that the movement of the liquid level in cup 81 will be proportional to $\frac{1}{2}C$.

The specific gravity apparatus is so designed that the liquid level in cup 75 will be proportional to $\frac{1}{2}Sk$.

In Figure 10, the heavy lines represent the liquid levels at standard conditions when $P=1$, $C=1$ and $Sk=1$. The balance beam is balanced by the weight W.

It will now be shown that under any other conditions the beam will still be balanced when the height of the liquid level in the P cup 25 is equal to the product of the liquid levels in C and Sk cups, 81 and 75.

In order to do this, the weight W is calculated at standard conditions. Then the weight W is calculated when the liquid level in the C cup 81 has moved to $j$, the liquid level in the Sk cup 75 has moved to $h$ and the movement in the P cup 25 has moved to $hj$. If these two values of W are equal the proposition is proved. Assume that the lever arms of the floats are all equal to $l$; and that the cups have no absolute weight, for obviously if they have weight it will be constant and can be balanced by a similar weight W'.

Also assume that the floats are cut off at the points where $P=.5$ and 2, $C=.5$ and 2 and $Sk=.5$ and 2. Furthermore, assume that clock-wise moments are considered positive and counter clock-wise moments negative.

Under standard conditions, the following is a solution for the weight W:

The cross sectional areas of the floats are $\frac{1}{P}$, $\frac{1}{C}$ and $\frac{1}{Sk}$, respectively.

The moments will then be equal to the submerged volumes multiplied by the density of the liquid $\Delta$ multiplied by the lever arm.

a float diameter is $$D = \sqrt{\frac{4}{\pi y}},$$

therefore, $$D_p = \sqrt{\frac{4}{\pi P}}, D_c = \sqrt{\frac{4}{\pi C}} \text{ and } D_{SK} = \sqrt{\frac{4}{\pi Sk}},$$

in which $D_p$, $D_c$ and $D_{SK}$ are the diameters of P, C and Sk floats respectively, and for the diameters of the cups $$\frac{\pi d^2}{4} = \frac{1}{y} + a,$$

$$d = \sqrt{\frac{4(1+ay)}{y}}, \text{ therefore}$$

$$l\Delta \int_1^2 \frac{dP}{P} + l\Delta \int_{.5}^1 \frac{dc}{C} - l\Delta \int_1^2 \frac{ds}{Sk} - W = 0$$

$$\log \frac{2}{1} + \log \frac{1}{.5} - \log \frac{2}{1} - \frac{W}{l\Delta} = 0$$

$$W = l\Delta \log \frac{1}{.5}$$

Changing the liquid levels to $j$, $h$ and $jh$ and solving again:

$$l\Delta \int_{jh}^2 \frac{dP}{P} + l\Delta \int_{.5}^1 \frac{dc}{C} - l\Delta \int_h^2 \frac{ds}{Sk} - W = 0$$

$$\log \frac{2}{jh} + \log \frac{j}{.5} - \log \frac{2}{h} - \frac{W}{l\Delta} = 0$$

$$\frac{W}{l\Delta} = \log \frac{2}{jh} \times \frac{j}{.5} \times \frac{h}{2} = \log \frac{1}{.5}$$

$$W = l\Delta \log \frac{1}{.5}$$

Hence, it will be seen that the value of W is the same when the height of liquid in the cup 25 (P cup) is equal to the product of the liquid levels in the cups 75 (S cup) and 81 (C cup).

The operation of apparatus made in accordance with my invention will be apparent from a consideration of the foregoing description of the structure and the neutralizing effects and operations referred to; however, the effects and operation of my apparatus will be briefly recapitulated.

First of all my apparatus operates to measure a gas flowing in a main under actual conditions of absolute pressure, specific gravity, temperature and moisture content, in standard units referred to predetermined conditions of temperature, absolute pressure, and moisture content. For example, such predetermined conditions for coke oven gas of a pressure of 30″ mercury, a temperature of 60° F. and a saturated moisture content corresponding to that temperature. As pointed out, the effects of changes in the factors of specific gravity, absolute pressure, temperature and moisture content, would be to result in changes in differential pressure across the orifice and consequent changes in area thereof if unrestrained; however, the effect of changes of each of these factors to change the area of the orifice is neutralized by the bringing into play of contrary effects.

Referring again to the equation $$\frac{P}{CS} = \left(\frac{Qs}{AK}\right)^2 \frac{1}{2gE},$$

in which $g$ and $E$ are constants, if the ratio $\frac{P}{CS}$ is held constant, the product AK is a measure of the gas flowing. In my apparatus, if the demand changes, the differential pressure, P, changes, and the area of the orifice changes, the latter resulting in an inverse change on the changed differential pressure, thereby restoring the normal value of P and the ratio $\frac{P}{CS}$. In other words, as soon as a change in demand for gas takes place, the level of fluid in the cup 25 rises or falls due to a change in differential pressure causing an elevation or lowering of the float 27, a tilting of the lever 28, and closing of the circuits of the motor 14, the latter operating to restrict or enlarge the orifice 13. As the orifice area is changed, the down-stream pressure, and hence the differential pressure, P, approach their former values; and when the former values are reached the lever 28 will be in an intermediate position with the motor circuits broken.

Thus the value of the ratio $\frac{P}{CS}$ has been restored in which case the new value of A in the product AK is a measure of the quantity (Qs) of gas flowing under standard conditions to meet the new demand.

If the specific gravity, absolute pressure, temperature, or moisture content should change, without any change in demand, the area, A, should remain the same in order that the determinations of the meter shall be in units under standard conditions. If the specific gravity changes, the differential pressure also changes so that the value of the ratio $\frac{P}{CS}$ remains unchanged and the lever 28 is not tilted. The same is true of changes in absolute pressure, temperature and moisture content.

If a change in specific gravity occurs the buoyant effect of the float 27 is changed due to a change in differential pressure, but, at the same time, the buoyant effect of float 76 is changed due to the change in specific gravity, these changes in effects take place in the same sense, that is, the levels of fluid in the cups 25 and 75 rise and fall together, with result that the lever 28 remains balanced in its neutral position.

In case of a change in temperature, absolute pressure, or moisture content, the level of fluid in the cup 81 rises or falls and the level of fluid in the cup 25 moves in the opposite direction to that in the cup 81 due to the change in differential pressure, so that the new buoyant effect of floats 27 and 82 remains the same and the lever 28 is not moved to close either of the circuits of the motor to enlarge or restrict the area of the orifice.

Since the recorder at 15 is connected to the mechanism which varies the orifice area, the area of the orifice is at all times a factor determining the operation thereof. While I have herein disclosed and particularly described orifice means of the iris shutter type, it is to be understood that, in so far as my invention is concerned, any suitable variable or adjustable valve or throat area adjusting means may be used.

From the foregoing, it will be apparent that I have devised a gas meter which is capable of determining automatically the quantity of gas flowing under variable conditions of the physical characteristics of specific gravity, absolute pressure, temperature, and moisture content and under varying demands in terms of standard units of quantity based upon predetermined conditions of temperature, absolute pressure and moisture content.

While I have shown my invention in but one form, it will be obvious to those skilled in the art that it is not so limited, but is susceptible of various other changes and modifications without departing from the spirit thereof, and I desire, therefore, that only such limitations shall be placed there-

Having thus described the invention what is claimed as new and desired to be secured by Letters Patent is:

1. In a gas meter, the combination of a valve having an adjustable orifice, means responsive to a change in differential pressure across the orifice for adjusting the size of the latter, and means responsive to a change in specific gravity of gas flowing through the main for controlling said size adjusting means to neutralize the effect of a change in differential pressure due to variation in specific gravity of the gas.

2. In a gas meter, the combination of a valve having an adjustable orifice, means responsive to a change in differential pressure across the orifice for varying the size of the latter, and means responsive to changes in absolute pressure, temperature, or moisture content of the gas flowing through the main for controlling said size varying means to neutralize the effect of the change in differential pressure due thereto upon said size varying means.

3. In apparatus of the character described, the combination of a gas main, a valve therein having an adjustable orifice, differential pressure means including a movable member for changing the size of the orifice upon a change in differential pressure, a chamber containing gas maintained at the same temperature and degree of saturation as the gas in the main, and means responsive to a change in volume of the gas in said chamber for opposing movement of said movable member incident to a change in differential pressure due to a change in moisture content or temperature of the gas in the main.

4. In apparatus of the character described, the combination of a gas main including a housing, an iris shutter defining an orifice in the main, a rotatable member for adjusting the iris shutter to vary the size of the orifice, a segmental gear portion carried by the rotary member, a shaft extending through the housing, a worm carried by the shaft and meshing with the segmental gear member, a reversible driving means connected to one end of the shaft, a recorder connected to the other end of the shaft, and means responsive to a change in differential pressure across the orifice for controlling the operation of said driving means.

5. In apparatus of the character described, the combination of a gas main, a valve therein having a contracting and expanding orifice, a shaft extending transversely of the main and operatively connected to the contracting and expanding orifice, reversible driving means operatively connected to one end of the shaft, a recorder operatively connected to the other end of the shaft, and controlling means for the driving means subject to a change in differential pressure across the orifice for controlling the operation of the driving means.

6. In apparatus of the character described, the combination of a main, a valve therein having a contracting and expanding orifice, a recorder including a stylus and a cam plate for determining the position of the stylus, reversible driving means for actuating said valve and the cam plate, and means responsive to a change in differential pressure across the orifice for controlling the operation of said driving means.

7. In a meter for fluids, the combination of an indicator, a valve having an adjustable orifice, means responsive to a change in differential pressure of fluid across the orifice to adjust said indicator, and means responsive to a change in specific gravity of the fluid for neutralizing the effect of the differential-pressure-responsive means in response to the change in specific gravity.

8. In a gas meter, the combination of a valve having an orifice, indicating means, means responsive to changes in the value of the ratio $\frac{P}{SC}$, where P is the differential pressure across the orifice, S is the specific gravity of gas, and C is equal to $$\frac{460+T}{17.64\,(B-X)}$$

in which T is the temperature of the gas in degrees Fahr. above zero, B is the absolute pressure, and X is the vapor pressure of water at the temperature T and the absolute pressure B, for changing the setting of the indicating means.

9. In a meter, the combination of a main, a valve therein having an adjustable orifice, a motor connected to the valve, and mechanism for controlling the motor responsive to the relation $\frac{P}{SC}$, where P is the differential pressure across the orifice, S is the specific gravity of gas, and C is the ratio of the volume of any quantity of gas flowing to the volume that would be occupied by the same quantity of gas under standard conditions of temperature, pressure and saturation.

10. In apparatus of the character described, the combination of a gas main, a valve therein having an adjustable orifice, a reversible motor for actuating said valve, a reversing switch for the motor, a lever cooperating with said reversing switch, means responsive to variation in differential pressure across the orifice due to variation in specific gravity of gas in the main for applying forces to one end of the lever, and means responsive to variation in specific gravity of the gas in the main for applying forces to the other end of the lever.

11. In apparatus of the character referred to, the combination of a gas main, a valve having a contracting and expanding orifice, a recorder, reversible driving means for said valve, means operatively connecting said driving means with a portion of said recording means, a first liquid containing vessel, means for varying the level of liquid therein in accordance with changes in differential pressure across the orifice, a second liquid containing vessel, means for varying the level of liquid therein in accordance with changes in specific gravity of gas flowing through said main, a third liquid containing vessel, means for varying the level of liquid therein in accordance with changes in temperature, absolute pressure or moisture content of gas flowing through said main, a lever, means cooperating therewith for controlling the operation of said driving means, a float carried by one end of the lever and arranged in the second vessel, and floats carried by the other end of the lever and arranged respectively in the first and third vessels.

12. In a meter, the combination of a gas main, a receptacle, means connected to the main and to the receptacle for confining a gas column, means connected to the receptacle for confining an air column, pressure-transmitting sealing means between said air and gas columns, a movable diaphragm in the receptacle adapted to separate the latter into air and gas chambers, and means operatively connected with said diaphragm for maintaining equilibrium of forces acting on the diaphragm and incident to variation in specific gravity of the gas.

13. In apparatus of the character described, the combination of a gas main, a receptacle, a supply of liquid therein, a movable member supported thereby, a vertical gas column container communicating with the main and with said receptacle at one side of said movable member, a vertical air column container communicating with said receptacle at the other side of said movable member, movable means interposed between said containers and separating said column of gas from said column of air, and means for yieldingly supporting said movable means.

14. In a gas meter, the combination of a main, a valve therein having an adjustable orifice, an indicator, means responsive to a change in differential pressure of gas across the orifice to adjust said indicator and means responsive to variation in absolute pressure of the gas for actuating said indicator adjusting means to neutralize the effects of the variation in differential pressure across the orifice due to variation in absolute pressure of the gas.

15. In a gas meter, the combination of a main, a valve therein having an adjustable orifice in the main, an indicator, means responsive to a change in differential pressure of gas across the orifice to adjust said indicator, and means responsive to variation in moisture content of the gas for actuating said indicator adjusting means to neutralize the effects of changes in differential pressure across the orifice due to variation in the moisture content of the gas.

16. In a meter, the combination of a main, a valve therein having an adjustable orifice, a motor for changing the size of the orifice to maintain a predetermined differential pressure across said orifice, means responsive to the differential pressure across the orifice for controlling the motor, and mechanism operated by the motor for continuously determining the product of the orifice area times the coefficient of discharge.

17. In a meter, the combination of a main, a valve therein having an adjustable orifice, a motor for changing the size of the orifice to maintain a predetermined differential pressure across said orifice, means responsive to the differential pressure across the orifice for controlling the motor, a member rotated by the motor and whose angular position is a function of the orifice area, said member being provided with a cam element whose radius for any angular position depends upon the product of the orifice area times the coefficient of discharge, and a follower moved by the cam element.

18. In a meter, the combination of a main, a valve therein having an adjustable orifice, a motor for changing the size of the orifice to maintain a predetermined differential pressure across said orifice, means responsive to the differential pressure across the orifice for controlling the motor, a member rotated by the motor and whose angular position is a function of the orifice area, said member being provided with a cam element whose radius for any angular position depends upon the product of the orifice area times the coefficient of discharge, a record member movable directly as a function of time, and a scriber movable by the cam element transversely with respect to movement of the record member.

19. In a meter, the combination of a valve having an adjustable orifice, valve actuating means responsive to the differential pressure across said orifice for varying the effective opening thereof, and means responsive to variation in a differential pressure affecting physical characteristic of the gas for controlling orifice adjusting operation of the valve actuating means incident to variation in differential pressure due to change in a for preventing orifice changing operation of said valve actuating means due to variation in specific gravity of the gas being measured, and confining means operatively connected with said pressure responsive means and containing counterbalancing quantities respectively of gas and air, said confining means being positioned to render the weight differential developed therein effective with respect to said pressure responsive means to neutralize the effect of the change in differential pressure across the orifice incident to a change in the specific gravity of the gas.

35. In apparatus of the character described, the combination of a main, a valve therein having an adjustable orifice, valve actuating means responsive to a change in differential pressure across the orifice, means for confining a vertical gas column connected to the main at its upper end, means for confining a vertical air column, pressure-transmitting separating means between the upper ends of said columns, and means responsive to a change in weight of the gas column and operatively connected to said gas and air confining means and to said valve actuating means for controlling operation of said actuating means, whereby to neutralize the effect of a change in differential pressure across the orifice incident to a change in specific gravity of the gas.

36. In apparatus of the character described, the combination of a main, a valve therein having a contracting and expanding orifice, a recorder including a stylus and a cam plate for determining the position of the stylus, and reversible driving means for actuating the cam plate and the valve having the contracting and expanding orifice to maintain a predetermined differential pressure across said orifice.

37. In a gas meter, the combination of a main, a valve therein having an adjustable orifice, an indicator, means responsive to a change in differential pressure of gas across the orifice means to adjust said orifice and said indicator, and means responsive to variation in temperature of the gas for actuating said orifice and said indicator adjusting means to neutralize the effects of the changes in differential pressure across the orifice means due to temperature variation.

38. In a meter, the combination of a main, a valve therein having an adjustable orifice, a reversible valve actuating motor, a reversing switch for said motor, a lever operatively connected with said switch, means responsive to variations in differential pressure across said orifice and due to variation in specific gravity of gas in the main and means responsive to variation in specific gravity of gas in the main for applying counter-balancing forces to said lever.

39. In an apparatus of the character described, the combination of a main, a valve therein having a variable orifice, a valve actuating motor, receptacles, means for connecting the interiors of said receptacles respectively with the main at the upstream and downstream sides of the orifice, a conduit between said receptacles, a liquid seal in said receptacles and said conduit, and means responsive to changes in level of the liquid seal for controlling the valve actuating operation of said motor.

40. In apparatus of the character described, the combination of a gas main, a valve therein having an adjustable orifice, a reversible valve actuating motor, a two-way switch for controlling said motor, a receptacle connected to the main at the entrance side of the orifice, a receptacle connected to the main at the discharge side of the orifice, a conduit connecting said receptacles, a liquid seal in said receptacles and said conduit, and means dependent upon the level of said liquid seal for actuating said switch to operate the motor forwardly or reversely.

41. In apparatus of the character described, the combination of a gas main, a valve therein having an adjustable orifice, a reversible valve actuating motor, a two-way switch for controlling said motor, a first receptacle connected to the main at the entrance side of the orifice, a second receptacle connected to the main at the discharge side of the orifice, a conduit connecting said receptacles, a liquid seal in said first and second receptacles and said conduit, a third receptacle in heat conducting contact with the main, a conduit connecting said third receptacle and said first receptacle, a liquid seal in said third receptacle, said first receptacle and said conduit, and means dependent upon changes in level of liquid in said seals for actuating said switch.

42. In apparatus of the character described, the combination of a gas main, a valve therein having an adjustable orifice, a motor for actuating said valve, controlling means for the motor, a receptacle communicating with the main at the entrance side of the orifice, a first cup in the receptacle, a supply of liquid therein, means for varying the level of liquid in said cup in accordance with the specific gravity of gas flowing through the main, a second cup in the receptacle, a supply of liquid therein, means for varying the level of liquid in the second cup in accordance with variations in differential pressure across the orifice, a third cup in the receptacle, a supply of liquid therein, means whereby the level of liquid in the third cup is varied in accordance with changes in temperature, absolute pressure or moisture content of gas flowing through the main, a lever for operating said controlling means, a float carried by one end of the lever and supported by the liquid in the first cup, and floats carried by the other end of the lever and supdifferential pressure affecting physical characteristic of the gas.

20. In a meter, the combination of a valve having an adjustable orifice, valve actuating means responsive to the differential pressure across said orifice for varying the effective opening thereof, and means responsive to variation in the moisture content of the gas for controlling orifice adjusting operation of the valve actuating means incident to variation in differential pressure due to a change in the moisture content of the gas.

21. In a meter, the combination of a valve having an adjustable orifice, valve actuating means responsive to the differential pressure across said orifice for varying the effective opening thereof, and means responsive to variation in temperature of the gas for controlling orifice adjusting operation of the valve actuating means incident to variation in differential pressure due to a change in the temperature of the gas.

22. In a meter, the combination of a valve having an adjustable orifice, valve actuating means responsive to the differential pressure across said orifice for varying the effective opening thereof, and means responsive to variations in absolute pressure of the gas for controlling orifice adjusting operation of the valve actuating means incident to variation in differential pressure due to change in the absolute pressure of the gas.

23. In a meter, the combination of a valve having an adjustable orifice, valve actuating means responsive to the differential pressure across said orifice for varying the effective opening thereof, and means responsive to variation in specific gravity of the gas for controlling orifice adjusting operation of the valve actuating means incident to variation in differential pressure due to change in the specific gravity of the gas.

24. In a meter, the combination of a valve having an adjustable sharp edge orifice, valve actuating means responsive to the differential pressure across said orifice for varying the effective opening thereof, recording means operatively connected with said valve actuating means, and means for actuating said recording means.

25. In a meter, the combination of a main, a valve therein having an adjustable sharp edge orifice, a valve actuating motor, and means responsive to the differential pressure across said orifice for controlling said motor, whereby the area of the orifice is maintained proportional to a known function of the quantity of gas flowing.

26. In a meter, the combination of a main, a valve therein having an adjustable orifice, valve actuating means adapted to be operated entirely by power other than that afforded by the pressure developed across the orifice, and differential pressure-responsive means operatively connected with the main at both sides of said valve for effecting operation of the valve actuating means.

27. In a meter, the combination of a main, a valve therein having an adjustable orifice, an indicator, a valve actuating motor operatively connected to the indicator and adapted to be operated entirely by power other than that afforded by the pressure developed across the orifice, and differential pressure-responsive means operatively connected with the main at both sides of said orifice for controlling operation of the motor.

28. In a meter, the combination of a main, a valve therein having an adjustable orifice, a valve actuating motor adapted to be operated entirely by power other than that afforded by the pressure developed across the orifice, and recording mechanism having a portion operated by the motor.

29. In a meter, the combination of a main, a valve therein comprising an adjustable iris shutter for defining an orifice, differential pressure responsive means for adjusting the shutter to vary the size of the orifice, and recording mechanism having a portion operated by said adjusting means.

30. In a meter, the combination of flow recording means, a main, a valve therein comprising an adjustable iris shutter for defining an orifice and a shutter actuating member, and means responsive to differential pressure across said orifice for actuating the rotary member and means for connecting the recording means and said differential pressure responsive means.

31. In a meter, the combination of a main, a valve therein comprising an adjustable iris shutter defining an orifice, valve actuating means for varying the size of the orifice, and means responsive to a change in differential pressure across the orifice for effecting operation of said valve actuating means.

32. In a meter, the combination of a main, a housing therein, a series of leaves pivoted to the housing and overlapping to define an orifice, means for turning each of the leaves simultaneously and to the same extent for varying the size of the orifice, a motor for operating said means, and a recorder operatively connected to the motor.

33. In a meter, the combination of a main, a housing therein, a series of leaves pivoted to the housing and overlapping to define an orifice, means for turning each of the leaves simultaneously and to the same extent for varying the size of the orifice, a motor for operating said means, and means responsive to a change in differential pressure across the orifice for rendering the motor effective.

34. In a meter, the combination of a main, a valve therein having an adjustable orifice, valve actuating means, means responsive to variation in differential pressure across said orifice for controlling operation of said valve actuating means, pressure responsive means ported respectively by the liquid in the second and third cups.

43. In apparatus of the character described, the combination of a gas main, a valve therein having an adjustable orifice, a motor for actuating said valve, controlling means for the motor, a receptacle communicating with the main at the entrance side of the orifice, a first cup in the receptacle, a supply of liquid therein, means for varying the level of liquid in said cup in accordance with the specific gravity of gas flowing through the main, a second cup in the receptacle, a supply of liquid therein, means for varying the level of liquid in the second cup in accordance with variations in differential pressure across the orifice, a third cup in the receptacle, a supply of liquid therein, means whereby the level of liquid in the third cup is varied in accordance with changes in temperature, absolute pressure or moisture content of gas flowing through the main, a lever for operating said controlling means, a float carried by one end of the lever and engaging the liquid in the first cup and having a downwardly tapered surface capable of giving a displacement equal to the logarithm of the liquid level, a float carried by the other end of the lever engaging the liquid in the second cup and having a downwardly tapered surface capable of giving a displacement equal to the logarithm of the liquid level, and another float carried by said other end of the lever and engaging the liquid in the third cup and having an upwardly tapering surface capable of giving a displacement equal to the logarithm of the liquid level.

44. In apparatus of the character described, the combination of a gas main, a valve therein having an adjustable orifice, a motor for adjusting said orifice, a receptacle communicating with the gas main at the entrance side of the orifice, a second receptacle communicating with the gas main at the discharge side of the orifice, a cup in the first receptacle and communicating with the interior of the second receptacle, a supply of liquid in said cup and second receptacle, a second cup in the first receptacle, a supply of liquid therein, means for supplying and withdrawing liquid to and from the second cup in accordance with changes in specific gravity of the gas flowing through said main, a third cup in the first receptacle, a supply of liquid therein, means for supplying and withdrawing liquid to and from the third cup in accordance with changes in temperature, absolute pressure or moisture content of gas flowing through said main, floats supported respectively by liquid in the several cups, and means operated by the floats for controlling the operation of the motor.

45. In apparatus of the character described, the combination of a gas main, a valve therein having a variable orifice, a reversible motor for adjusting the orifice, a receptacle in communication with the gas main at the entrance side of the orifice, a first cup in the receptacle, a supply of liquid therein, means for varying the level of liquid in said cup in accordance with changes in specific gravity of gas flowing through said main, a second cup in the receptacle, a supply of liquid therein, means for changing the level of liquid in the second cup in accordance with changes in differential pressure across the orifice, a third cup in the receptacle, a supply of liquid therein, means for changing the level of liquid in the third cup in accordance with changes in temperature, absolute pressure and moisture content of gas flowing through said main, floats arranged within the cups, and means operated by the floats for controlling operation of said motor.

46. In apparatus of the character described, the combination of a gas main, a valve having a contracting and expanding orifice, a recorder, a recorder and valve actuating motor, a switch for said motor, switch operating means responsive to a change in differential pressure across the orifice to control the operation of said motor, means responsive to a change in specific gravity of gas flowing through said main for controlling said switch to neutralize the effect of the change in differential pressure incident thereto on said switch, and means responsive to change in temperature, absolute pressure or moisture content of gas flowing through said main for controlling said switch to neutralize the effects of variations in differential pressure incident thereto on the operation of said switch.

47. In apparatus of the character referred to, the combination of a gas main, a valve having a contracting and expanding orifice, a recorder, a recorder and valve actuating motor, and motor controlling means including a vessel, a supply of liquid therein whose level varies in accordance with a change in differential pressure across the orifice, a second vessel, a supply of liquid therein, a receptacle communicating with the second vessel and in contact with the main, heat-insulating material for the outside of the latter receptacle, a third vessel, a supply of liquid therein whose level varies in accordance with changes in specific gravity of gas flowing through said main, controlling means for the motor, and floats cooperating respectively with the liquid in the respective vessels and connected to the controlling means.

48. In a meter for fluids, the combination of a main, a valve therein having an adjustable orifice, an indicator, means responsive to a change in differential pressure of fluid across the orifice for actuating said valve to adjust said orifice and said indicator, and means responsive to variation in a differential pressure affecting physical characteristic of the fluid passing through the main for actuating said orifice and said indicator adjusting means to neutralize the effects of changes in differential pressure due thereto upon said indicator.

49. In a meter, the combination of a main, a valve therein having a variable orifice, motor means for actuating said valve, means for controlling said motor including a closed container having a plurality of intercommunicating compartments, a supply of liquid in said compartments, a float in one of said compartments, and means for operatively connecting the float and the motor.

50. In a meter, the combination of a main, a valve therein having a variable orifice, motor means for actuating said valve, means for controlling said motor including a closed container having a plurality of intercommunicating compartments, a supply of liquid in said compartments, and means responsive to variations in the level of the liquid in one of the compartments for actuating the motor means.

In testimony whereof I hereunto affix my signature this 10th day of August 1923.

GARRETT B. LINDERMAN, Jr.